US012117201B2

(12) United States Patent
St. Clair et al.

(10) Patent No.: US 12,117,201 B2
(45) Date of Patent: Oct. 15, 2024

(54) PROCESS FLANGE HEATER STANDOFF ASSEMBLY

(71) Applicant: Watlow Electric Manufacturing Company, St. Louis, MO (US)

(72) Inventors: Curt St. Clair, Hannibal, MO (US); Matthew T. Lanham, Frankford, MO (US); Ken Gaulke, New London, MO (US); John Abbott, Hannibal, MO (US); Kenny Sinclair, Hannibal, MO (US)

(73) Assignee: Watlow Electric Manufacturing Company, St. Louis, MO (US)

(*) Notice: Subject to any disclaimer, the term of this patent is extended or adjusted under 35 U.S.C. 154(b) by 252 days.

(21) Appl. No.: 17/884,067

(22) Filed: Aug. 9, 2022

(65) Prior Publication Data

US 2023/0049957 A1 Feb. 16, 2023

Related U.S. Application Data

(60) Provisional application No. 63/231,447, filed on Aug. 10, 2021.

(51) Int. Cl.
*F28F 9/02* (2006.01)
*F24H 1/10* (2022.01)
*H05B 3/82* (2006.01)

(52) U.S. Cl.
CPC ............... *F24H 1/102* (2013.01); *H05B 3/82* (2013.01); *F24H 2250/02* (2013.01); *H05B 2203/007* (2013.01)

(58) Field of Classification Search
CPC ....... F24H 1/102; F24H 2250/02; H05B 3/82; H05B 2203/007
USPC .......................................................... 165/158
See application file for complete search history.

(56) References Cited

U.S. PATENT DOCUMENTS

| | | | |
|---|---|---|---|
| 4,593,178 | A | 6/1986 | Banta et al. |
| 2007/0141919 | A1 | 6/2007 | Fannin et al. |
| 2012/0073955 | A1 | 3/2012 | Mcclanahan et al. |

FOREIGN PATENT DOCUMENTS

| | | | |
|---|---|---|---|
| CN | 107318180 A | * | 11/2017 |
| JP | 2010064413 A | * | 3/2010 |
| WO | 2014100118 A1 | | 6/2014 |

OTHER PUBLICATIONS

International Search Report and Written Opinion issued in corresponding International Application No. PCT/US2022/039810 dated Nov. 14, 2022, 10 pages.

* cited by examiner

*Primary Examiner* — Davis D Hwu
(74) *Attorney, Agent, or Firm* — Burris Law, PLLC

(57) ABSTRACT

A standoff assembly for use in terminating a plurality of resistive heaters disposed within a fluid vessel includes a pressure adapter plate, an electrical enclosure adapter plate, and a plurality of conduits. An end portion of each of the resistive heating elements extends through the pressure adapter plate. The electrical enclosure adapter plate is spaced apart from the pressure adapter plate to define a dry volume therebetween. The conduits are secured to the pressure adapter plate and the electrical enclosure adapter plate. Each conduit is aligned concentrically with each of the resistive heating elements. An electrical termination portion of each resistive heating element is disposed within the conduit.

20 Claims, 7 Drawing Sheets

PROCESS FLANGE HEATER STANDOFF ASSEMBLY

CROSS-REFERENCE TO RELATED APPLICATION

This application claims priority to and the benefit of U.S. Provisional Patent Application No. 63/231,447, filed Aug. 10, 2021. The disclosure of the above application is incorporated herein by reference in its entirety.

FIELD

The present disclosure relates to a fluid heat exchangers, and more particularly to the assembly and termination of resistance heaters used within fluid heat exchangers.

BACKGROUND

The statements in this section merely provide background information related to the present disclosure and may not constitute prior art.

Heat exchangers generally include a tubular vessel and a plurality of resistive heaters disposed inside the tubular vessel. Each resistive heater includes at least one resistive heating element. Working fluid enters the tubular vessel at one longitudinal end and exits at the other longitudinal end. The working fluid is heated by the resistive heating elements as the working fluid flows inside the tubular vessel. In some heat exchangers, there exists a heated section where the working fluid flows through the fluid vessel and a non-heated section where the working fluid is not heated. In such heat exchangers, the resistive heaters have an extension portion that extends through the non-heated section.

In order to repair or replace one or more of the heating elements in such heat exchanger, the heat exchanger is disassembled and individual or all heating elements are severed or cut off to gain access to the heating element(s) needing repairing or replacing. Such a repair is time consuming and can lead to undesirable down-time of the heat exchanger.

These issues related to the repair of heating elements used within fluid heat exchangers, among other issues related to heat exchangers, are addressed by the present disclosure.

SUMMARY

This section provides a general summary of the disclosure and is not a comprehensive disclosure of its full scope or all of its features.

In one form, the present disclosure discloses a standoff assembly for use in terminating a plurality of resistive heaters disposed within a fluid vessel. Each resistive heater includes at least one resistive heating element with an electrical termination portion. The standoff assembly includes a pressure adapter plate, an electrical enclosure adapter plate, and a plurality of conduits. An end portion of each of the resistive heating elements extends through the pressure adapter plate. The electrical enclosure adapter plate is spaced apart from the pressure adapter plate to define a dry volume therebetween. The plurality of conduits are secured to the pressure adapter plate and the electrical enclosure adapter plate. Each of the plurality of conduits are aligned concentrically with each of the resistive heating elements. The electrical termination portion of each resistive heating element is disposed within the conduit.

In some configurations of the standoff assembly of the above paragraph, the pressure adapter plate and the electrical enclosure adapter plate extend transversely to a longitudinal axis of the resistive heating elements.

In some configurations of the standoff assembly of any one or more of the above paragraphs, the conduits are secured to the pressure adapter plate and the electrical enclosure adapter plate via one of welding, brazing, and swaging.

In some configurations of the standoff assembly of any one or more of the above paragraphs, the conduits are mechanically secured to the pressure adapter plate and the electrical enclosure adapter plate.

In some configurations of the standoff assembly of any one or more of the above paragraphs, the standoff assembly further includes a plurality of electrical conductors extending through a respective conduit and having first and second ends. The first end electrically coupled to a power supply and the second end electrically coupled to a respective electrical termination portion of each of the resistive heaters.

In another form, the present disclosure discloses a standoff assembly for use in terminating a plurality of resistive heaters disposed within a fluid vessel. Each resistive heater includes at least one resistive heating element with an electrical termination portion. The standoff assembly includes a pressure adapter plate, an electrical enclosure adapter plate, a plurality of conduits, a plurality of electrical conductors and insulation material. An end portion of each of the resistive heating elements extends through the pressure adapter plate. The electrical enclosure adapter plate is spaced apart from the pressure adapter plate to define a dry volume therebetween. The plurality of conduits are secured to the pressure adapter plate and the electrical enclosure adapter plate. Each of the plurality of conduits are aligned concentrically with each of the resistive heating elements. The electrical termination portion of each resistive heating element is disposed within the conduit. The electrical conductors extend through a respective conduit and include first and second ends. The first end electrically coupled to a power supply and the second end electrically coupled to a respective electrical termination portion of each of the resistive heaters. The insulation material is disposed within each conduit and surrounds the electrical conductors.

In some configurations of the standoff assembly of the above paragraph, the conduits are secured to the pressure adapter plate and the electrical enclosure adapter plate via one of welding, brazing, swaging, or mechanical attachment.

In some configurations of the standoff assembly of any one or more of the above paragraphs, the conduits are threadingly secured to the pressure adapter plate and the electrical enclosure adapter.

In yet another form, the present disclosure discloses a heat exchanger including a plurality of resistive heaters disposed within a fluid vessel. Each resistive heater includes at least one resistive heating element with an electrical termination portion. The heat exchanger includes a pressure retaining flange, a heated section, and a non-heated section. The heated section is disposed on one side of the pressure retaining flange with fluid flowing through the fluid vessel. The non-heated section is disposed on an opposite side of the pressure retaining flange. The non-heated section includes a pressure adapter plate, an electrical enclosure adapter plate, and a plurality of conduits. The pressure adapter plate is coupled to the pressure retaining flange. An end portion of each of the resistive heating elements extends through the pressure retaining flange and the pressure adapter plate. The electrical enclosure adapter plate is spaced apart from the pressure adapter plate to define a dry volume therebetween. The plurality of conduits are secured to the pressure adapter plate and the electrical enclosure adapter plate. Each of the plurality of conduits is aligned concentrically with each of the resistive heating elements. The electrical termination portion of each resistive heating element is disposed within the conduit.

In some configurations of the heat exchanger of the above paragraph, the pressure adapter plate is sealingly engaged to the pressure retaining flange.

In some configurations of the heat exchanger of any one or more of the above paragraphs, the pressure adapter plate is coupled to the pressure retaining flange by soldering, brazing, welding or mechanical attachment.

In some configurations of the heat exchanger of any one or more of the above paragraphs, a plurality of electrical conductors extend substantially through a respective conduit and includes first and second ends. The first end electrically coupled to a power supply and the second end electrically coupled to a respective electrical termination of each of the resistive heaters.

In some configurations of the heat exchanger of any one or more of the above paragraphs, each of the electrical conductors are surrounded by insulation material.

In yet another form, the present disclosure discloses a heat exchanger including a plurality of resistive heaters disposed within a fluid vessel. Each resistive heater includes at least one resistive heating element with an electrical termination portion. The heat exchanger includes a pressure retaining flange, a heated section, and a non-heated section. The heated section is disposed on one side of the pressure retaining flange with fluid flowing through the fluid vessel. The non-heated section is disposed on an opposite side of the pressure retaining flange. The non-heated section includes a pressure adapter plate, an electrical enclosure adapter plate, and a plurality of conduits. The pressure adapter plate is removably coupled to the pressure retaining flange. An end portion of each of the resistive heating elements extends through the pressure retaining flange and the pressure adapter plate. The electrical enclosure adapter plate is spaced apart from the pressure adapter plate to define a dry volume therebetween. The plurality of conduits are secured to the pressure adapter plate and the electrical enclosure adapter plate. Each of the plurality of conduits is aligned concentrically with each of the resistive heating elements. The electrical termination portion of each resistive heating element is disposed within the conduit.

In some configurations of the heat exchanger of the above paragraph, a sealing member is disposed between the pressure retaining flange and the pressure adapter plate.

In some configurations of the heat exchanger of any one or more of the above paragraphs, the sealing member is a gasket or an O-ring.

In some configurations of the heat exchanger of any one or more of the above paragraphs, the pressure adapter plate is removably coupled to the pressure retaining flange via mechanical fasteners.

In some configurations of the heat exchanger of any one or more of the above paragraphs, the pressure adapter plate and the electrical enclosure adapter plate extend transversely to the resistive heating elements.

In some configurations of the heat exchanger of any one or more of the above paragraphs, an outer diameter of the pressure retaining flange is greater than an outer diameter of the pressure adapter plate.

In some configurations of the heat exchanger of any one or more of the above paragraphs, a thickness of the pressure retaining flange is greater than a thickness of the pressure adapter plate.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
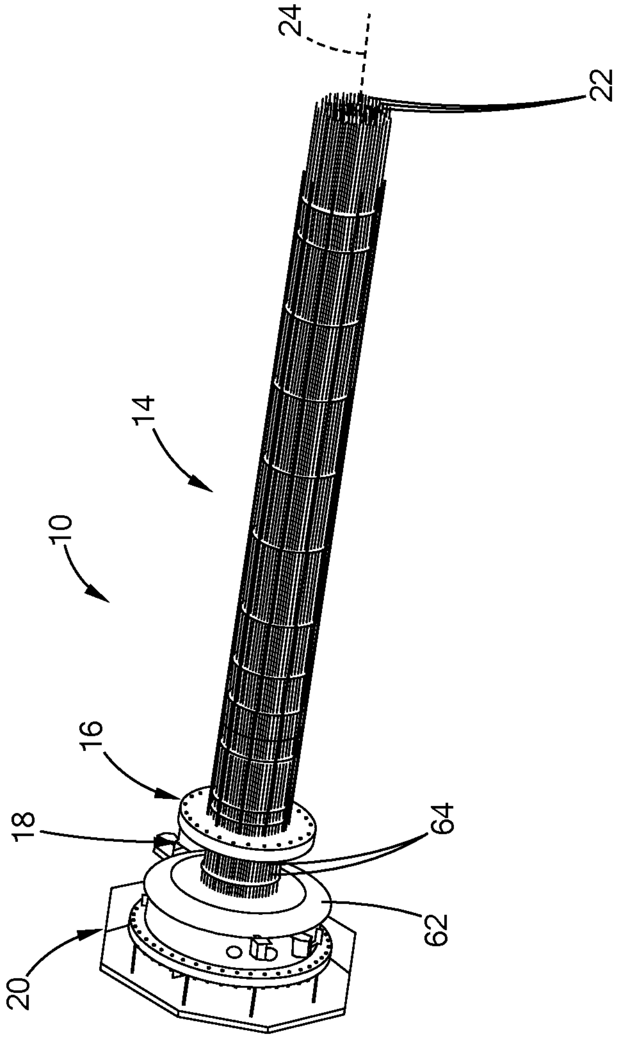
FIG. 1 is a perspective view of a heat exchanger including a standoff assembly in accordance with teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
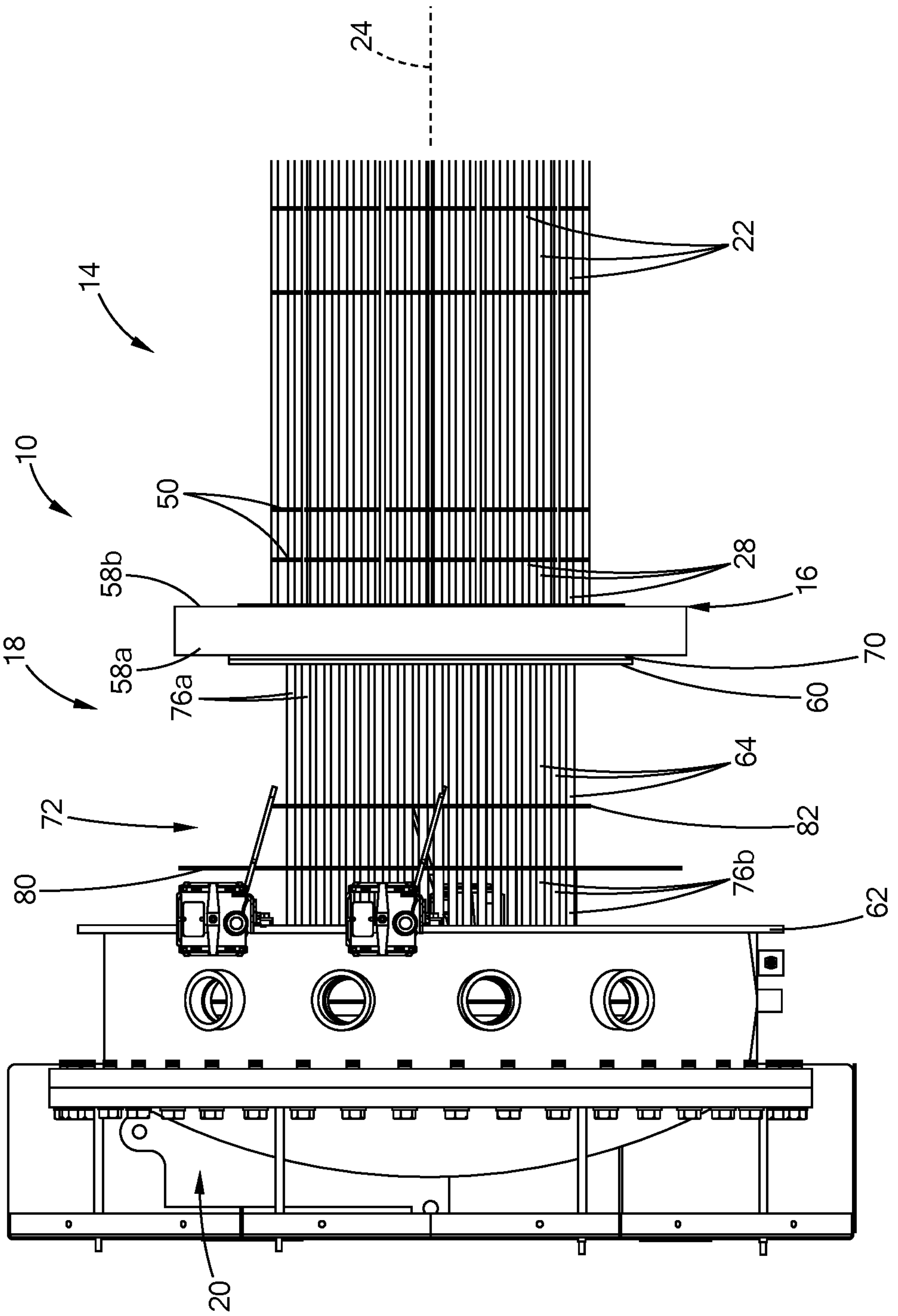
FIG. 2 is a side view of a portion of the heat exchanger of FIG. 1.
Figure 3:
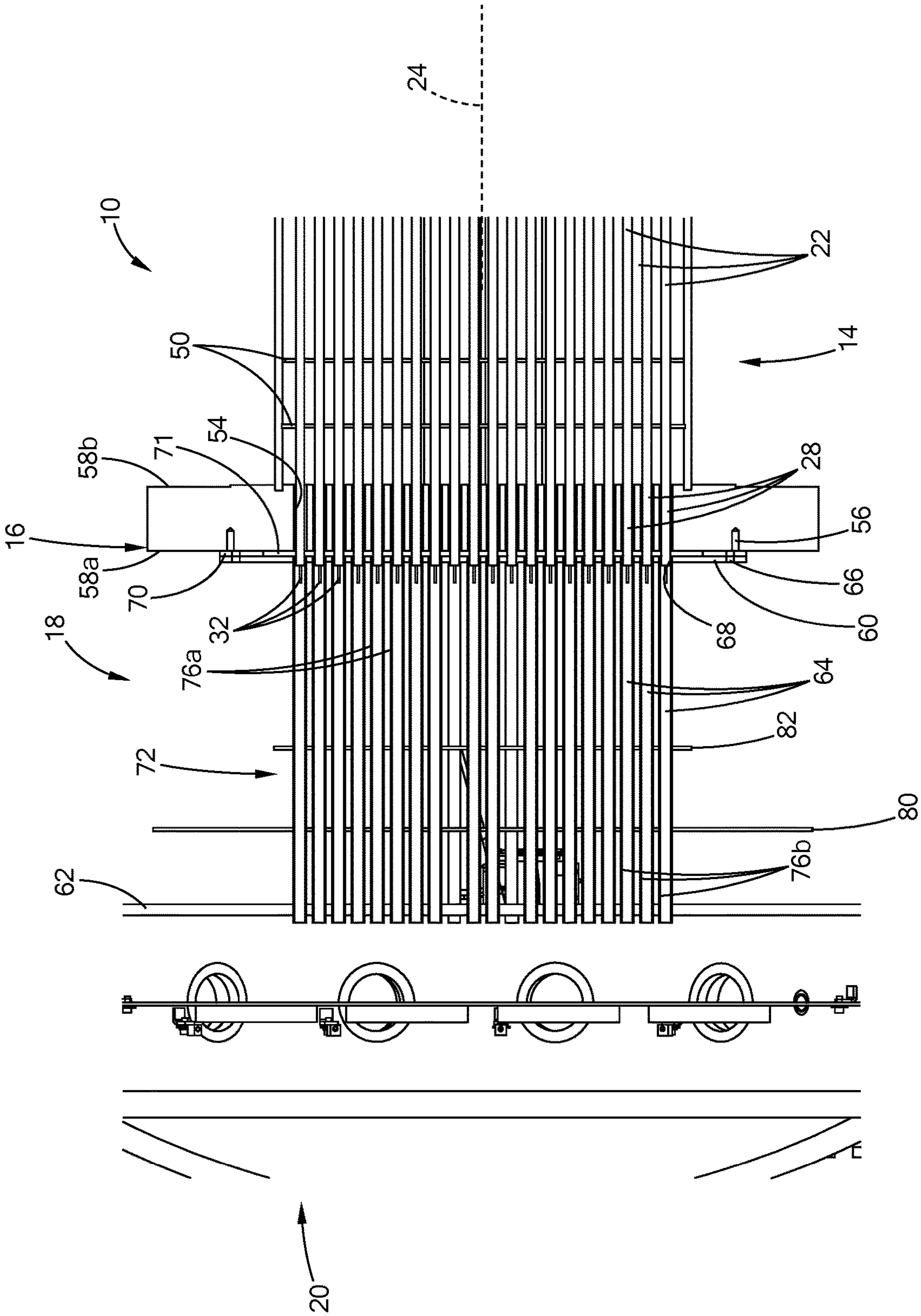
FIG. 3 is a side cross-sectional view of a portion of the heat exchanger of FIG. 1.

Referring to FIGS. 1-3, an example heat exchanger 10 is illustrated. The heat exchanger 10 includes a heated section 14, a pressure retaining flange 16, a standoff assembly or non-heated section 18, and an electrical enclosure 20. The heated section 14 is disposed on one side of the pressure retaining flange 16 and includes a plurality of resistive heaters 22 extending parallel to a longitudinal axis 24 of the heat exchanger 10 between the pressure retaining flange 16 and a neutral terminal (not shown). Each resistive heater 22 has a first end portion secured to the neutral terminal and a second end portion 28 secured to the retaining flange 16.

Figure 4:
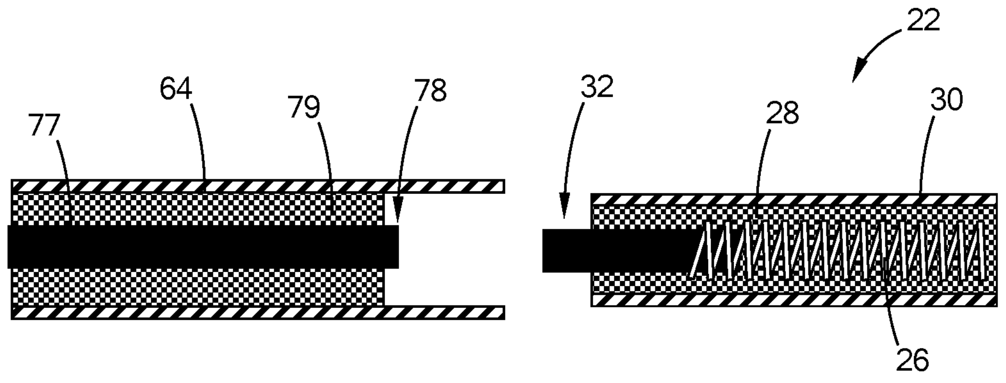
FIG. 4 is another cross-sectional view of a portion of the heat exchanger of FIG. 1, including a portion of a resistive heater and a portion of a conduit of the standoff assembly constructed in accordance with the teachings of the present disclosure.

As shown in FIG. 4, each resistive heater 22 also comprises at least one resistive heating element 26 with an electrical termination portion 32, insulation material 28, and an outer sheath 30. The insulation material 28 surrounds the heating element 26 and a portion of the electrical termination portion 32. The outer sheath 30 houses the heating element 26, the insulation material 28 and a portion of the electrical termination portion 32. The resistive heaters 22 may be one of a tubular heater, a cartridge heater, a multicell heater, or any heater construction with a configuration to provide both heating of the fluid within the heated section 14 of the heat exchanger 10. The plurality of resistive heaters 22 are disposed within a tube or fluid vessel (not shown) having a first port or inlet/outlet (not shown) proximate to the retaining flange 16 and a second port or inlet/outlet (not shown) proximate to the neutral terminal. Fluid can be pumped into the tube via one of the inlet/outlets and it flows through the tube in contact with the resistive heaters 22 until it exits via the other inlet/outlet. It should be understood that the term "fluid" is to be construed to include solids, liquids, gases, and plasma, among other material states while remaining within the scope of the present disclosure. Further structural details of fluid heat exchangers are disclosed in U.S. Pat. No. 6,944,394 and U.S. Publication 2021/0136876, which are commonly owned with the present application and the contents of which are incorporated herein by reference in their entirety.

Baffles 50 may also optionally be disposed within the tube and may act as support members that support the plurality of resistive heaters 22 relative to each other and relative to the tube. The baffles 50 can also direct the flow of the fluid along a flow pathway between the two inlet/outlets. In some configurations, a single continuous helical shape baffle may be provided that defines a helical flow pathway. For example, the helical shape baffle may be similar to that shown and described in U.S. Publication No. 2019/0063853, which is commonly owned with the present application and the entire disclosure of which is incorporated herein by reference. While described with reference to heating a fluid flowing through the tube, the heated section 14 may be used without the tube in other applications such as submersion heating for example.

With reference to FIGS. 1-3 and 6, the pressure retaining flange 16 is annular-shaped and extends transversely to the longitudinal axis 24 of the heat exchanger 10. As shown best in FIG. 6, the pressure retaining flange 16 includes a plurality of first apertures 52, a plurality of second apertures 54, and a plurality of third apertures 56. The plurality of first apertures 52 are located near a periphery of the pressure retaining flange 16. The plurality of first apertures 52 are also circumferentially spaced apart around the pressure retaining flange 16 and surround the plurality of second and third apertures 54, 56. Each first aperture 52 extends through the pressure retaining flange 16 (i.e., each first aperture 52 extends from a first axial end surface 58*a* of the pressure retaining flange 16 to an opposing second axial end surface 58*b* of the pressure retaining flange 16). Mechanical fasteners (not shown; screws, bolts, rivets, etc.) extend through the first apertures 52 and apertures (not shown) of a flange (not shown) of the tube, thereby securing the tube and the pressure retaining flange 16 to each other.

The plurality of second apertures 54 are located at or near a central portion of the pressure retaining flange 16. Each second aperture 54 extends through the pressure retaining flange 16 (FIG. 6; each second aperture 54 extends from the first axial end surface 58*a* of the pressure retaining flange 16 to the opposing second axial end surface 58*b* of the pressure retaining flange 16). Each of the resistive heaters 22 extend through a respective second aperture 54 such that the electrical termination portion 32 is located within the non-heated section 18 of the heat exchanger 10. In one form, the outer sheath 30 of each resistive heater 22 is welded to the pressure retaining flange 16 at the first axial end surface 58*a* or the second axial end surface 58*b* such that fluid flowing through the tube does not flow to the non-heated section 18 of the heat exchanger 10. In some configurations, the outer sheath of each resistive heater 22 is secured to the pressure retaining flange 16 at the first axial end surface 58*a* or the second axial end surface 58*b* by brazing or soldering.

The plurality of third apertures 56 are positioned radially between the first and second apertures 52, 54 and extend partially through the pressure retaining flange 16 (FIG. 3; each third aperture 56 extends from the first axial end surface 58*a* toward the opposing second axial end surface 58*b*). The plurality of third apertures 56 are also circumferentially spaced apart around the pressure retaining flange 16 and surround the plurality of second apertures 54. The third apertures 56 are described in greater detail below and are generally used to secure the standoff assembly 18 to the pressure retaining flange 16.

The standoff assembly 18 is positioned on the other side, or the dry side, of the pressure retaining flange 16 (i.e., between the pressure retaining flange 16 and the electrical enclosure 20), and terminates the resistive heaters 22 disposed within the tube (not shown). With reference to FIGS. 1-3 and 7, the standoff assembly 18 includes an annular-shaped pressure adapter plate 60, an annular-shaped enclosure adapter plate 62, a plurality of conduits 64, and a plurality of electrical conductors 65 (FIG. 4). In some configurations, the entire standoff assembly 18 or one or more components of the standoff assembly 18 may be housed within a vessel (not shown). The pressure adapter plate 60 is removably coupled to the first axial end surface 58*a* of the pressure retaining flange 16 and extends transversely to the longitudinal axis 24 of the heat exchanger 10. In one form the pressure adapter plate 60 has an outer diameter that is smaller than an outer diameter of the pressure retaining flange 16, and a thickness that is less than a thickness of the pressure retaining flange 16. Although the pressure adapter plate 60 shown in the figures is flat, the pressure adapter plate 60 could also take on other shapes that are not flat (e.g., the pressure adapter plate 60 may be arcuate).

Figure 5:
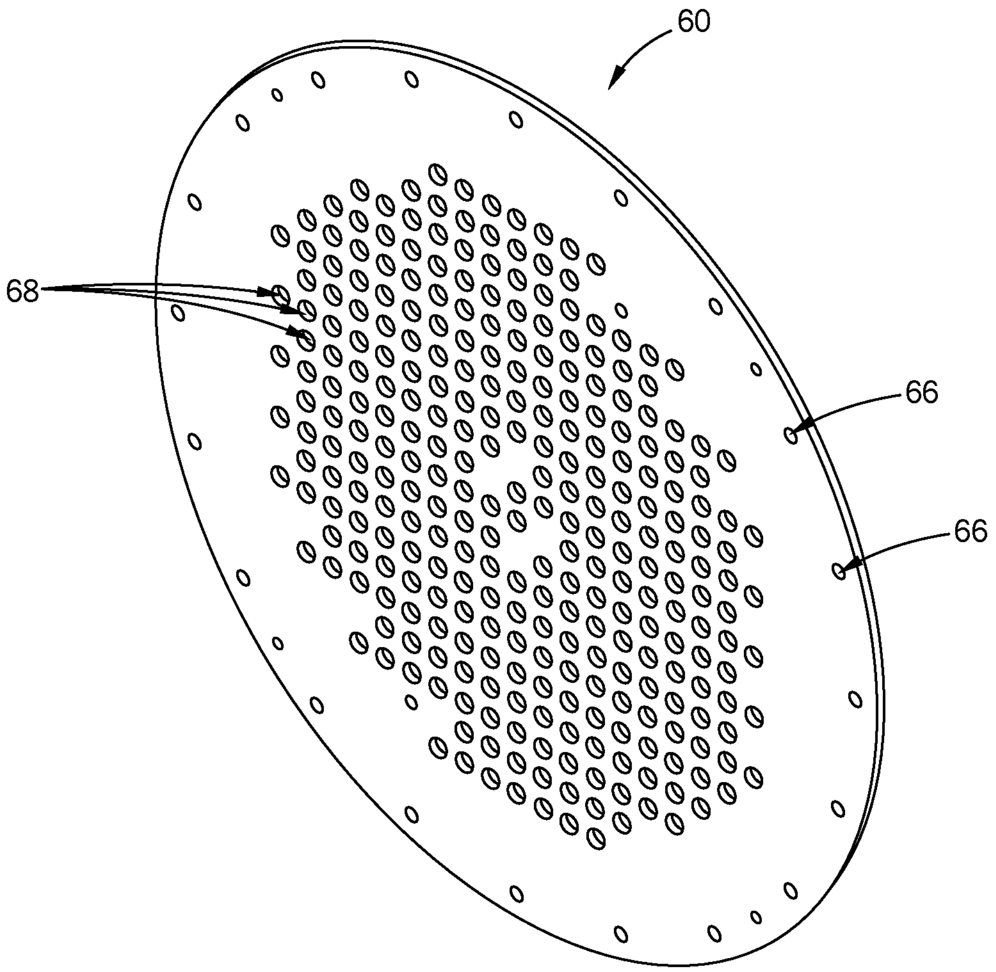
FIG. 5 is a perspective view of an adapter plate of the standoff assembly of the heat exchanger of FIG. 1.
Figure 6:
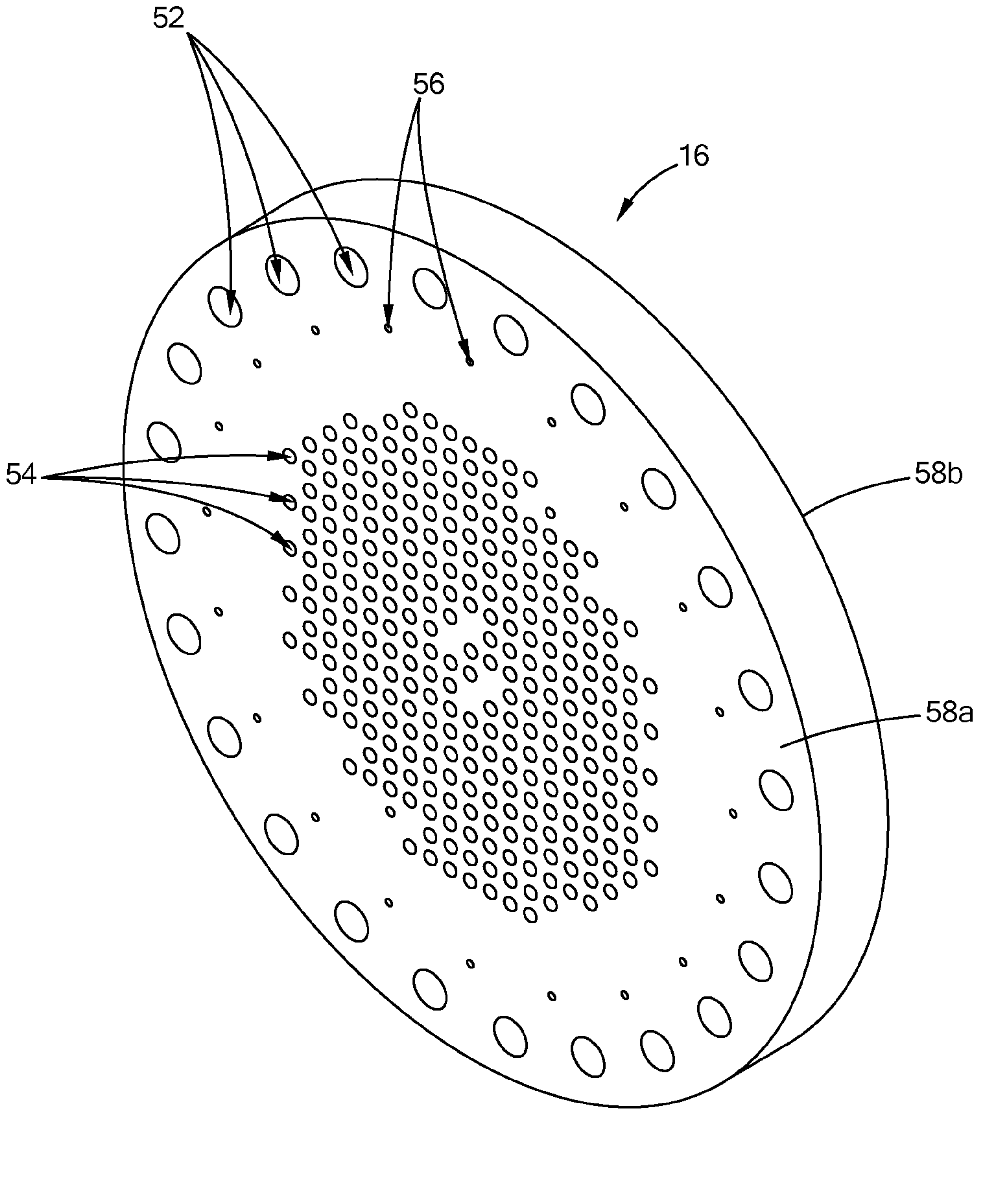
FIG. 6 is a perspective view of a pressure retaining flange of the heat exchanger of FIG. 1.

As best shown in FIG. 5, the pressure adapter plate 60 includes a plurality of first apertures 66 and a plurality of second apertures 68. The plurality of first apertures 66 extend through the pressure adapter plate 60 and are circumferentially spaced apart around the pressure adapter plate 60. The plurality of first apertures 66 surround the plurality of second apertures 68 and are aligned with respective third apertures 56 of the pressure retaining flange 16. In this way, mechanical fasteners (not shown) such as screws, bolts, or rivets, for example, may extend through the first apertures 66 of the pressure adapter plate 60 and the third apertures 56 of the pressure retaining flange 16 to removably couple the pressure adapter plate 60 to the pressure retaining flange 16. An adapter ring 70 (FIGS. 2 and 3) is disposed between the pressure retaining flange 16 and the pressure adapter plate 60, and provides space for the heaters 22 being welded to flange 16. A sealing member 71 (FIGS. 2 and 3) may also be disposed between the pressure retaining flange 16 and the pressure adapter plate 60, and may be disposed radially inwardly relative to the adapter ring. The sealing member 71 may be a gasket or an o-ring, for example. In some configurations, the sealing member 71 may be omitted and the pressure adapter plate 60 may be coupled to the pressure retaining flange 16 by soldering, brazing or welding instead of via mechanical fasteners. In this way, the pressure adapter plate 60 is sealingly engaged to the pressure retaining flange 16.

The second apertures 68 are located at a central portion of the pressure adapter plate 60 and extend through the pressure adapter plate 60. The second apertures 68 are aligned with respective second apertures 54 of the pressure retaining flange 16.

The enclosure adapter plate 62 is welded to the electrical enclosure 20 and extends transversely to the longitudinal axis 24 of the heat exchanger 10. In some configurations, the enclosure adapter plate 62 is coupled to the electrical enclosure 20 by soldering, brazing, or mechanical fasteners. The enclosure adapter plate 62 is also spaced apart from the pressure adapter plate 60 to define a dry volume 72 therebetween (i.e., fluid flowing through the tube is inhibited from flowing to the dry volume 72). The enclosure adapter plate 62 has an outer diameter that is independent of the outer diameter of the pressure retaining flange 16 and the outer diameter of the pressure adapter plate 60. For example, the outer diameter of the enclosure adapter plate 62 may be greater than the outer diameter of the pressure retaining flange 16 and the outer diameter of the pressure adapter plate 60. Although the enclosure adapter plate 62 shown in the figures is flat, the enclosure adapter plate 62 could also take on other shapes that are not flat (e.g., the enclosure adapter plate 62 may be arcuate).

As shown best in FIGS. 2 and 3, the plurality of conduits 64 include a first end 76*a* secured to the pressure adapter plate 60 and a second end 76*b* secured to the enclosure adapter plate 62. The first end 76*a* and the second end 76*b* are secured and sealed to the adapter plates 60, 62, respectively, via welding, brazing, or swaging. In some configurations, the first end 76*a* and the second end 76*b* may be threadingly secured to the adapter plates 60, 62, respectively. The first end 76*a* of the plurality of conduits 64 may extend at least partially through a respective second aperture 68 of the pressure adapter plate 60. Each of the conduits 64 are aligned concentrically with a respective resistive heating element 26 and the electrical termination portion 32 of each of the resistive heating elements 26 is disposed within the conduit 64 (i.e., the electrical termination portion 32 extends minimally through the conduit 64).

As shown in FIG. 4, the plurality of electrical conductors 77 extend through a respective conduit 64 and includes a first end (not shown) and a second end 78. The first end is electrically coupled to a power supply (not shown) and the second end 78 is electrically coupled to a respective electrical termination portion 32. The first end can be electrically coupled to the power supply via mechanical fasteners, soldering, brazing, or welding, for example. Similarly, the second end 78 can be electrically coupled to the respective electrical termination portion 32 via mechanical fasteners, soldering, brazing, or welding, for example. In some configurations, the electrical conductors 77 can be rods of various shapes and materials, or wires of various materials or forms (e.g., wires may be solid, stranded, bare, or with an insulation covering). Insulation material 79 is disposed within each conduit 64 and surrounds the electrical conductors 77. In some configurations, the insulation material 79 also surrounds the electrical termination portion 32 within the conduit 64. The insulation material 79 can be ceramic preforms, powders, slurries, epoxies, silicones, or dielectric gas, for example.

Figure 7:
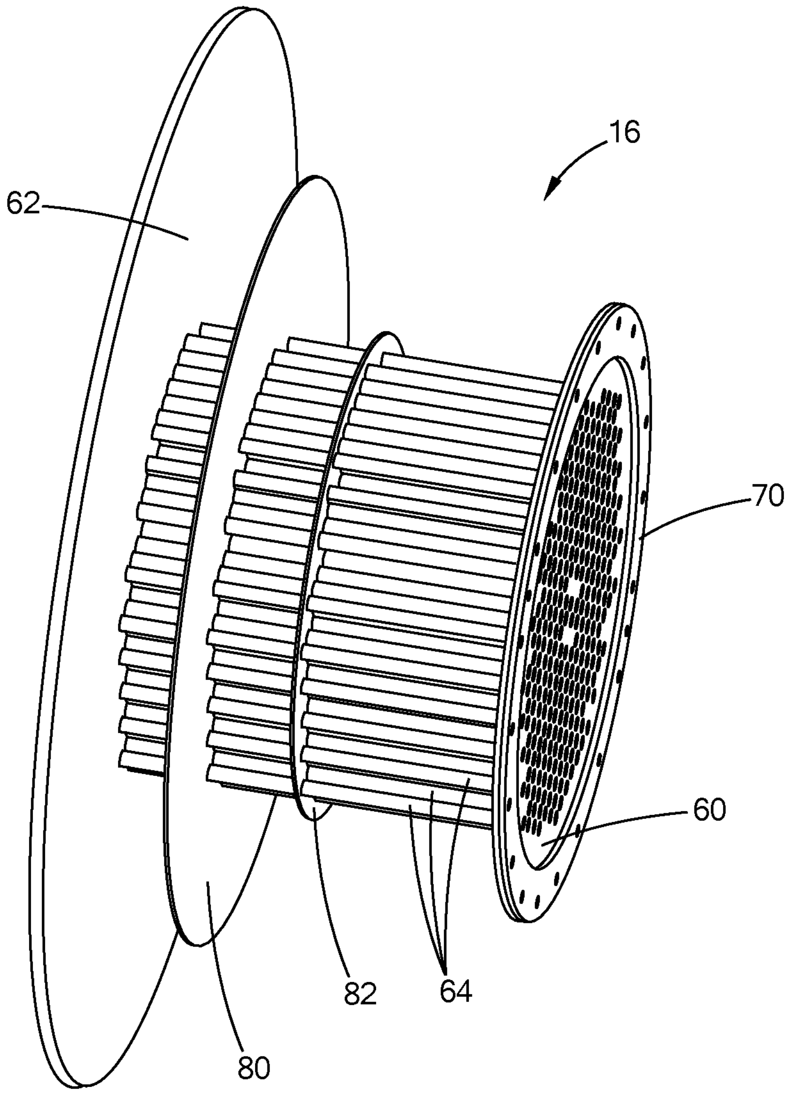
FIG. 7 is a perspective view of the standoff assembly of the heat exchanger of FIG. 1.

As shown in FIGS. 2, 3, and 7, the standoff assembly 18 may optionally include a heat shield 80 and an insulation retainer 82. The heat shield 80 is coupled to the conduits 64 (i.e., the conduits 64 extend through the heat shield 80) and inhibits heat transfer to the electrical enclosure 20. The insulation retainer 82 is also coupled to the conduits 64 (i.e., the conduits 64 extend through the insulation retainer 82) and secures insulation material (not shown) covering the conduits 64.

The standoff assembly 18 of the present disclosure provides the benefit of allowing the pressure adapter plate 60 to be conveniently decoupled from the pressure retaining flange 16 which allows for repairs and replacement of individual resistive heaters 22, for example, without fully disassembling the heat exchanger 10. The standoff assembly 18 of the present disclosure also provides the benefit of allowing each resistive heater 22 to be secured to the pressure retaining flange 16 at the first axial end surface 58*a* or the second axial end surface 58*b* without fully disassembling the heat exchanger 10 (e.g., cutting through the heat exchanger 10).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A standoff assembly for use in terminating a plurality of resistive heaters disposed within a fluid vessel, each resistive heater comprising at least one resistive heating element with an electrical termination portion, the standoff assembly comprising:

a pressure adapter plate, wherein an end portion of each of the resistive heating elements extends through the pressure adapter plate;

an electrical enclosure adapter plate, the electrical enclosure adapter plate spaced apart from the pressure adapter plate to define a dry volume therebetween; and a plurality of conduits secured to the pressure adapter plate and the electrical enclosure adapter plate, each of the plurality of conduits aligned concentrically with each of the resistive heating elements, wherein the electrical termination portion of each resistive heating element is disposed within the conduit.

2. The standoff assembly according to claim 1, wherein the pressure adapter plate and the electrical enclosure adapter plate extend transversely to a longitudinal axis of the resistive heating elements.

3. The standoff assembly according to claim 1, wherein the conduits are secured to the pressure adapter plate and the electrical enclosure adapter plate via one of welding, brazing, and swaging.

4. The standoff assembly according to claim 1, wherein the conduits are threadingly secured to the pressure adapter plate and the electrical enclosure adapter plate.

5. The standoff assembly according to claim 1, further comprising a plurality of electrical conductors extending through a respective conduit and having first and second ends, the first end electrically coupled to a power supply and the second end electrically coupled to a respective electrical termination portion of each of the resistive heaters.

6. A standoff assembly for use in terminating a plurality of resistive heaters disposed within a fluid vessel, each resistive heater comprising at least one resistive heating element with an electrical termination portion, the standoff assembly comprising:

a pressure adapter plate, wherein an end portion of each of the resistive heating elements extends through the pressure adapter plate;

an electrical enclosure adapter plate, the electrical enclosure adapter plate spaced apart from the pressure adapter plate to define a dry volume therebetween;

a plurality of conduits secured to the pressure adapter plate and the electrical enclosure adapter plate, each of the plurality of conduits aligned concentrically with each of the resistive heating elements, wherein the electrical termination portion of each resistive heating element is disposed within the conduit;

a plurality of electrical conductors extending through a respective conduit and having first and second ends, the first end electrically coupled to a power supply and the second end electrically coupled to a respective electrical termination portion of each of the resistive heaters; and insulation material disposed within each conduit and surrounding the electrical conductors.

7. The standoff assembly according to claim 6, wherein the conduits are secured to the pressure adapter plate and the electrical enclosure adapter plate via one of welding, brazing, and swaging.

8. The standoff assembly according to claim 6, wherein the conduits are threadingly secured to the pressure adapter plate and the electrical enclosure adapter.

9. A heat exchanger comprising a plurality of resistive heaters disposed within a fluid vessel, each resistive heater comprising at least one resistive heating element with an electrical termination portion, the heat exchanger comprising:

a pressure retaining flange;

a heated section disposed on one side of the pressure retaining flange with fluid flowing through the fluid vessel; and a non-heated section disposed on an opposite side of the pressure retaining flange, the non-heated section comprising:

a pressure adapter plate coupled to the pressure retaining flange, wherein an end portion of each of the resistive heating elements extends through the pressure retaining flange and the pressure adapter plate;

an electrical enclosure adapter plate, the electrical enclosure adapter plate spaced apart from the pressure adapter plate to define a dry volume therebetween; and a plurality of conduits secured to the pressure adapter plate and the electrical enclosure adapter plate, each of the plurality of conduits aligned concentrically with each of the resistive heating elements, wherein the electrical termination portion of each resistive heating element is disposed within the conduit.

10. The heat exchanger according to claim 9, wherein the pressure adapter plate is sealingly engaged to the pressure retaining flange.

11. The heat exchanger according to claim 9, wherein the pressure adapter plate is coupled to the pressure retaining flange by soldering, welding, or brazing.

12. The heat exchanger according to claim 9, further comprising a plurality of electrical conductors extending substantially through a respective conduit and having first and second ends, the first end electrically coupled to a power supply and the second end electrically coupled to a respective electrical termination of each of the resistive heaters.

13. The heat exchanger according to claim 12, wherein each of the electrical conductors are surrounded by insulation material.

14. A heat exchanger comprising a plurality of resistive heaters disposed within a fluid vessel, each resistive heater comprising at least one resistive heating element with an electrical termination portion, the heat exchanger comprising:

a pressure retaining flange;

a heated section disposed on one side of the pressure retaining flange with fluid flowing through the fluid vessel; and a non-heated section disposed on an opposite side of the pressure retaining flange, the non-heated section comprising:

a pressure adapter plate removably coupled to the pressure retaining flange, wherein an end portion of each of the resistive heating elements extends through the pressure retaining flange and the pressure adapter plate;

an electrical enclosure adapter plate, the electrical enclosure adapter plate spaced apart from the pressure adapter plate to define a dry volume therebetween; and a plurality of conduits secured to the pressure adapter plate and the electrical enclosure adapter plate, each of the plurality of conduits aligned concentrically with each of the resistive heating elements, wherein the electrical termination portion of each resistive heating element is disposed within the conduit.

15. The heat exchanger according to claim 14, further comprising a sealing member disposed between the pressure retaining flange and the pressure adapter plate.

16. The heat exchanger according to claim 15, wherein the sealing member is a gasket or an O-ring.

17. The heat exchanger according to claim 14, wherein the pressure adapter plate is removably coupled to the pressure retaining flange via mechanical fasteners.

18. The heat exchanger according to claim 14, wherein the pressure adapter plate and the electrical enclosure adapter plate extend transversely to the resistive heating elements.

19. The heat exchanger according to claim 14, wherein an outer diameter of the pressure retaining flange is greater than an outer diameter of the pressure adapter plate.

20. The heat exchanger according to claim 14, wherein a thickness of the pressure retaining flange is greater than a thickness of the pressure adapter plate.

* * * * *